US010204114B2

(12) United States Patent
Aguilera et al.

(10) Patent No.: US 10,204,114 B2
(45) Date of Patent: *Feb. 12, 2019

(54) REPLICATING DATA ACROSS DATA CENTERS

(71) Applicant: MICROSOFT TECHNOLOGY LICENSING, LLC, Redmond, WA (US)

(72) Inventors: Marcos Kawazoe Aguilera, Mountain View, CA (US); Brian Cho, Urbana, IL (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/856,275

(22) Filed: Dec. 28, 2017

(65) Prior Publication Data

US 2018/0121466 A1    May 3, 2018

Related U.S. Application Data

(63) Continuation of application No. 13/600,902, filed on Aug. 31, 2012, now Pat. No. 9,870,374.

(51) Int. Cl.
*G06F 17/30* (2006.01)
*H04L 29/08* (2006.01)
*G06F 11/20* (2006.01)

(52) U.S. Cl.
CPC .... *G06F 17/30212* (2013.01); *H04L 67/1095* (2013.01); *H04L 67/32* (2013.01); *G06F 11/2094* (2013.01); *G06F 11/2097* (2013.01)

(58) Field of Classification Search
CPC .......... G06F 17/30212; G06F 11/2094; G06F 11/2097; H04L 67/1095; H04L 67/32
See application file for complete search history.

(56) References Cited

U.S. PATENT DOCUMENTS

| | | |
|---|---|---|
| 6,167,402 A | 12/2000 | Yeager |
| 6,360,272 B1 | 3/2002 | Lincke et al. |
| 6,411,967 B1 | 6/2002 | Van Renesse |
| 6,922,762 B2 | 7/2005 | Hirakawa et al. |
| 6,952,741 B1 | 10/2005 | Bartlett et al. |
| 7,636,424 B1 | 12/2009 | Halikhedkar et al. |

(Continued)

OTHER PUBLICATIONS

"Accelerating Business Continuity Through Virtualization—aCelera (TM) Sync Backup and Replication across the WAN", Retrieved from <<http://citeseerx.ist.psu.edu/viewdoc/download?doi=10.1.1.164.3519&rep=rep1&type=pdf>>, Feb. 27, 2012, 7 Pages.

(Continued)

*Primary Examiner* — Tarek Chbouki

(74) *Attorney, Agent, or Firm* — Workman Nydegger

(57) ABSTRACT

The present techniques prioritize transmission of feature information associated with data copies in data transmission, and selectively transmit the data copies when necessary. As the size of the feature information is small compared with the data copies, and as feature information is transmitted using prioritized messages, delays caused by congestion in the network are reduced. Based on the use of prioritized messages, the present techniques provide solutions for replicating data across data centers when conducting various data operations including reading, writing, and modifying data. The present techniques also replicate data across data centers while providing consistency, access locality, and disaster tolerance.

20 Claims, 9 Drawing Sheets

(56) References Cited

U.S. PATENT DOCUMENTS

| | | | |
|---|---|---|---|
| 7,769,722 | B1 | 8/2010 | Bergant et al. |
| 8,380,659 | B2 | 2/2013 | Zunger |
| 2002/0161789 | A1 | 10/2002 | Schaefer et al. |
| 2005/0187992 | A1 | 8/2005 | Prahlad et al. |
| 2007/0121521 | A1 | 5/2007 | D'Amico et al. |
| 2008/0159322 | A1 | 7/2008 | Takagi |
| 2008/0215663 | A1 | 9/2008 | Ushiyama |
| 2010/0124196 | A1 | 5/2010 | Bonar et al. |
| 2011/0029488 | A1 | 2/2011 | Fuerst et al. |
| 2011/0235575 | A1 | 9/2011 | Tapia et al. |
| 2011/0275342 | A1 | 11/2011 | Ramle et al. |
| 2012/0144036 | A1 | 6/2012 | Venkatsubra et al. |
| 2013/0268560 | A1 | 10/2013 | Pallares Lopez et al. |
| 2013/0304706 | A1 | 11/2013 | MacInnis |

OTHER PUBLICATIONS

"Integrating Data from Multiple Sites (Server)", Retrieved from <<https://msdn.microsoft.com/en-us/library/ms152761.aspx>>, Aug. 15, 2010, 4 Pages.

"Three Approaches to Remote Replication", Retrieved from <<http://searchdatabackup.techtarget.com/feature/Three-approaches-to-remote-replication>>, Feb. 27, 2012, 12 Pages.

"Using F5 WANJet to Accelerate EMC SRDF (R): Optimizing Data Replication for Business Continuity & Disaster Recovery", In White Paper of F5 Networks, Nov. 25, 2008, 7 Pages.

"Final Office Action Issued in U.S. Appl. No. 13/600,902", dated Aug. 1, 2016, 20 Pages.

"Final Office Action Issued in U.S. Appl. No. 13/600,902", dated Jun. 1, 2017, 23 Pages.

"Non-Final Office Action Issued in U.S. Appl. No. 13/600,902", dated Dec. 30, 2016, 21 Pages.

"Non-Final Office Action Issued in U.S. Appl. No. 13/600,902", dated Jun. 19, 2014, 16 Pages.

"Non-Final Office Action Issued in U.S. Appl. No. 13/600,902", dated Oct. 9, 2015, 19 Pages.

"Non-Final Office Action Issued in U.S. Appl. No. 13/600,902", dated Feb. 16, 2016, 19 Pages.

"Notice of Allowance Issued in U.S. Appl. No. 13/600,902", dated Aug. 24, 2017, 8 Pages.

Dahlin, et al., "Safe Speculative Replication", Retrieved from <<http://www.cs.utexas.edu/users/dahlin/papers/ssr-preprint.pdf>>, Aug. 24, 2007, 48 Pages.

Kuzmanovic, et al., "HSTCP-LP: A Protocol for Low-Priority Bulk Data Transfer in High-Speed High-RTT Networks", In the Proceedings of Workshop on Protocols for Fast Long-Distance Networks, Feb. 16, 2004, 2 Pages.

REPLICATING DATA ACROSS DATA CENTERS

CROSS REFERENCE TO RELATED APPLICATION

The application is a continuation of U.S. patent application Ser. No. 13/600,902, filed Aug. 31, 2012 and entitled "REPLICATING DATA ACROSS DATA CENTERS," the entire contents of which are incorporated by reference herein in their entirety.

BACKGROUND

Web applications such as web mail services, search engines, online stores, portals, social networks, and others are being increasingly deployed in data centers or sites that are distributed over many geographic locations. Data of these web applications are often replicated and stored in different data centers to provide disaster tolerance, access locality, and read scalability. It is necessary to maintain consistency of these replicated data among different data centers, which requires synchronization of data across the different data centers, henceforth called sites. However, such data synchronization may often suffer from problems of congestion in the network, thereby causing transmission latency unacceptable to users.

A conventional solution is to increase bandwidth of the cross-site links for peak usage. This solution, however, can be expensive and wasteful, especially since many computing systems may not frequently operate at peak usage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the present disclosure.

Consider an example in which a plurality of data copies need to be replicated in a consistent manner at a plurality of computing devices such as servers or computer storage media in different data centers. The present techniques separate a respective data copy stored at a respective server or computer storage medium from its respective feature information, and use a prioritized message to transmit the respective feature information of the respective data copy apart from the respective data copy itself. The present techniques then determine whether the respective data copy associated with the respective feature information is qualified for transmission. The respective feature information may indicate one or more attributes of the respective data copy stored at the respective server, such as its update information (e.g., when it was last updated, its version number, etc.), unique identification (ID), etc. A size of the feature information is a small fraction of a size of the data.

In the data transmission, the present techniques prioritize the transmission of the feature information over a network to avoid delay due to transmission of the relatively large data. The prioritization may direct that the transmission of the respective feature information is prior to the transmission, if any, of the respective data copy. For example, the present techniques may firstly use the respective prioritized message to transmit the respective feature information and then determine whether the respective data copy is qualified for transmission (e.g., whether the respective data copy is latest data copy among multiple data copies, whether the respective data copy is stored at a local server relative to a computing system that requests the data or performs operations on the data).

The prioritization may also direct that the prioritized message including the feature information, when propagated from local servers at a local data center to remote servers at remote data centers, be transmitted via a privileged path while the respective data copy be transmitted via a non-privileged path. Based on the prioritized message, the present techniques provide solutions for replicating data across data centers when conducting various data operations including reading, writing, and modifying data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
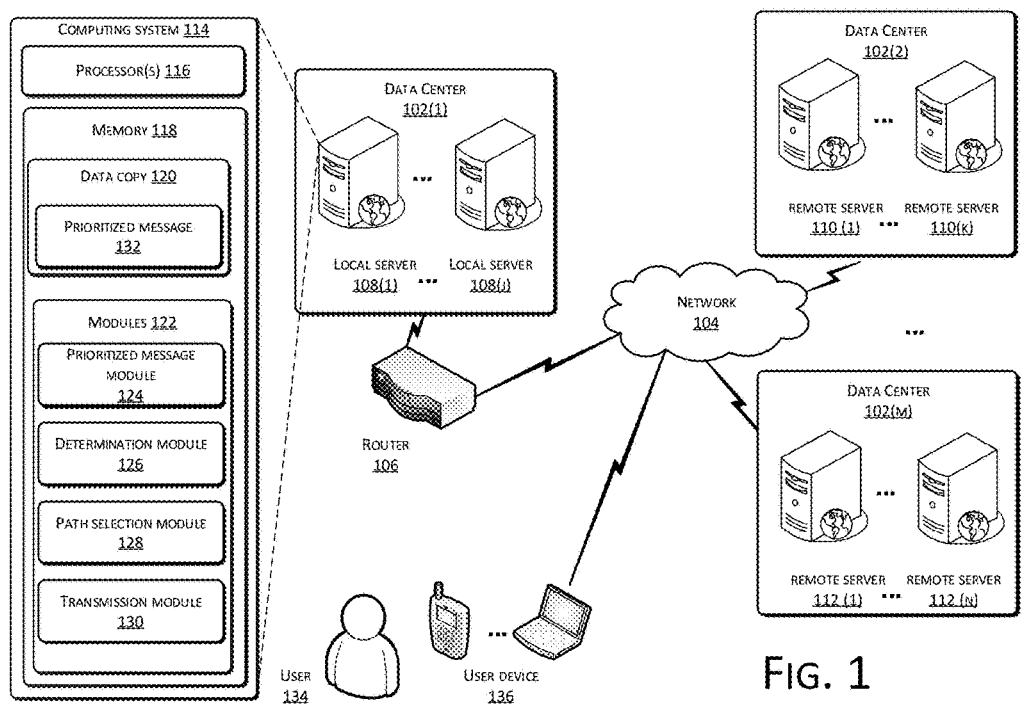
FIG. 1 illustrates an example scenario for replicating data across different data centers.

The present techniques separate a respective data copy from some or all of its respective feature information in data transmission, use a prioritized message to transmit the respective feature information, and then determine whether the respective data copy is qualified for transmission based on one or more factors. The one or more factors may include, for example, whether the respective data copy is a latest data copy at least partly based on an analysis of the respective feature information of the respective data copy and feature information of other data copies stored at other servers across a plurality of data centers. The one or more factors may also include, for example, whether the respective data copy is stored at a local server relative to a computing system that requests the data.

In one example embodiment, the present techniques read a latest data copy from a plurality of data copies stored at a plurality of computing devices including but not limited to servers across different data centers. For illustration purpose, unless stated otherwise, the servers in the present disclosure are used as examples of the computing devices. In one example, there may be three phases for the reading operation. In a first phase, a computing system retrieves multiple update indicators, such as timestamps, respectively from at least some of the plurality of servers that store the data copies, and identifies a first update indicator that indicates presently latest update information, such as a highest timestamp, from the multiple update indicators. In a second phase, the computing system requests the plurality of servers to send their respective data copies if they are associated with update indicators, such as a second update indicator, including update information that is at least as up-to-date as that of the first update indicator. A server may reply only if its respective update indicator is at least as up-to-date as the first update indicator, such that its timestamp is at least as large as the highest timestamp. Alternatively, the computing system may choose to request the latest data copy from the local servers. The second phase may be completed when the computing system obtains its first reply. In a common case, this reply arrives quickly from a local server in the same data center as the computing system. In a third phase, the computing system writes back the first update indicator or the second update indicator if it exists to the plurality of servers using prioritized messages. When the computing system receives at least some acknowledgments, it completes the read operation.

In one example embodiment, the present techniques write new data to the plurality of servers across different data centers. In one example, there may be two phases for the writing operation. In a first phase, the computing system obtains new data and a new update indicator, such as a new timestamp, associated with the new data. The computing system sends the new data and the new update indicator to the local servers. The computing system waits for acknowledgments from at least some of the local serves. In a second phase, the computing system uses prioritized messages to send the update indicator, such as the timestamp, to the plurality of servers. When the computing system receives acknowledgments from at least some of the plurality of local servers, it completes the write operation. Meanwhile, the local servers propagate the new data to the remote servers at remote data centers.

In one example embodiment, the present techniques modify data copies at the plurality of servers across different data centers. The modification data operation may use some techniques of the reading operation and writing operations as described above. In one example, there may be four phases of the modifying operation. In a first phase, a computing system retrieves update indicators, such as timestamps, from at least some of the plurality of servers that store the data copies, and identifies a first update indicator that indicates presently latest update information, such as a highest timestamp, from the multiple update indicators. In a second phase, the computing system requests the plurality of servers to send their respective data copies if they are associated with update indicators, such as a second update indicator, including update information that is at least as up-to-date as that of the first update indicator. A server may reply only if its respective update indicator is at least as up-to-date as the first update indicator, such that its timestamp is at least as large as the highest timestamp. The second phase may be completed when the computing system obtains its first reply. In a third phase, the computing system applies one or more modification commands to modify the obtained data copy to obtain a modified data copy and associates the modified data copy with a new update indicator and stores them at the local servers. In a fourth phase, the computing system uses prioritized messages to send the new update indicator to the plurality of servers. When the computing system receives acknowledgments from at least some of the plurality of servers, it completes the modifying operation. Meanwhile, the local servers propagate the modified data copy to the remote servers at remote data centers.

In another example, if the latest data copy resides at a remote server, instead of retrieving the data copy from the remote server, the computing system may send the one or more modification commands and the new update indicator to the remote server and to request the remote server to apply the commands to its data copy to form the modified data copy.

FIG. 1 illustrates an example scenario for replicating data across different data centers. In the example of FIG. 1, there is a plurality of data centers 102(1), . . . , 102(m), where m may be any positive integer, connected by a network 104. The network 104 may be a wired or wireless network such as intranet or Internet. For example, the data centers 102 may be geo-distributed such that a data center 102(1) is located at Seattle, Wash. of U.S., a data center 102(2) is located at Austin, Tex. of U.S., a data center 102(m) is located in Singapore, etc. In the example of FIG. 1, the data center 102(1) connects to the network 104 via a router 106.

Each of the data centers 102 may include one or more servers. In the example of FIG. 1, the data center 102(1) includes one or more servers 108(1), . . . , 108(j), where j may be any positive integer. The data center 102(2) includes one or more server 110(1), . . . , 110(k), where k may be any positive integer. The data center 102(m) includes one or more servers 112(1), . . . , 112(n), where n may be any positive integer. Typically, servers, such as the servers 108 within a same data center like the data center 102(1), are connected to each other by a local area network with low latency and high bandwidth. The data centers, such as the data center 102(1) and the data center 102(m), are connected to each other via wide area network which has lower bandwidth and higher latencies than the local area network within a data center. In other words, data transmission speed or cost between servers in one data center, such as between the server 110(1) and 110(j), is much faster or cheaper than that between servers in different data centers, such as between the server 110(j) and the server 112(n).

The present techniques are described from a perspective of a computing system 114, providing functionality of replicating data across different data centers and/or servers, that resides at the data center 102(1). As the computing system 114 resides at the data center 102(1), there will be low latency and high transmission speed between servers 108 in the data center 102(1) and the computing system 114. Thus, from the perspective of the computing system 114, the data center 102(1) is a local data center and the servers 108 are local servers relative to the computing system 114. The other data centers and servers are remote servers relative to the computing system 114. The local data center or server is a relative concept. In another example, from a perspective of another computing system residing at the data center 102(m), the data center 102(m) may be a local data center and the servers at the data center 102(m) such as the server 112(n) may be the local servers relative to the other computing system.

In the example of FIG. 1, the computing system 114 may reside at the server 108(1) of the data center 102(1). In another example, the computing system 114 may reside at an independent server (not shown in FIG. 1) such as a proxy machine, separate from the servers 108, at the data center 102(1). In yet another example, the computing system 114 may reside at the router 106, close to an external network connection of the data center 102(1).

In one example, the computing system 114 may directly perform operations on the data copies, such as the local data copies stored at the local servers 108. In another example, the computing system 114 may delegate a respective server to perform the operation on behalf of the computing system 114. Such techniques saves bandwidth of the computing system 114 at the expense of the added latency of a local round trip if the respective server is a local server.

The computing system 114 may include one or more processor(s) 116 and memory 118. Memory 118 may include volatile memory, non-volatile memory, removable memory, non-removable memory, and/or a combination of any of the foregoing. Generally, memory 118 contains computer executable instructions that are accessible to and executable by the one or more processors 116. The memory 118 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Any number of program modules, applications, or components can be stored in the memory 118. In the example of FIG. 1, the memory 118 may include a respective data copy 120 stored at the server 108(1) and one or more modules 122. In another example, the data copy 120 may be stored at another memory (not shown in FIG. 1) separate from the memory 118. That is, the data copy 120 may be separate from the computing system 114. The data copy 120 may comprise any kind of data, such as a text document, an image, an audio file, a multimedia file, or any data segments with any sizes. For example, the data copy 120 may be a user profile at a website, an item of goods on sale at the web site, a shopping cart of a user at the web site, etc.

In a writing data operation, the data copy 120 may be newly created data and stored at the local server 108(1) and the computing system 114 is to propagate the data copy 120 from the local server 108(1) to remote servers at remote data centers. In a reading or modifying operation, there are various data copies already stored at the various servers across the data centers 102. The data copy 120 may be one of these data copies and may be stored in the server 108(1). For example, all the various data copies may refer to a same object such as the user profile of a user. As the various data copies may be stored and/or updated at different times or have different versions at different servers, it is possible that the data copy 120 stored at the server 108(1) is different from another data copy stored at another server within a same or different data center among the data centers 102.

The modules 122 may include a prioritized message module 124, a determination module 126, a path selection module 128, and a transmission module 130.

The prioritized message module 124 separates the data copy 120 and one or more of its feature information, and includes the one or more feature information in a prioritized message 132. The one or more feature information may include update information of the data copy 120, an ID of the data copy 120, etc. In one example, the prioritized message module 124 may generate the prioritized message 132 and associate the prioritized message 132 with the data copy 120. In another example, the prioritized message module 124 may divide the data copy 120 into two parts: the prioritized message 132 and a non-prioritized message part. The non-prioritized message part includes other contents in the data copy 120 that are not the prioritized message 132.

For example, the feature information may include metadata information associated with or extracted from the data copy 120. To reduce the overhead of storing metadata, data objects may be grouped into containers, and all objects in the container share all or parts of the same metadata. The container of an object is fixed and container id is a part of the data object's key. That is, the data copy 120 may be a container that includes multiple data objects. A directory service stores the metadata for each container. The computing system 114 may consult the directory service for parts of the metadata or cache parts of the metadata.

The prioritized message 132 may include at least an update indicator that indicates update information of the data copy 120. For example, the update indicator may be a timestamp that indicates when the data copy 120 was last updated at the server 108(1) where the data copy 120 is stored. For another example, the update indicator may be a version number representing an update version of the data copy 120. A size of the prioritized message 132 is a fraction of a size of the data copy 120. For example, the prioritized message 132 may be tens of bytes while the data copy 120 may be several kilobytes.

The determination module 126 determines whether the data copy 120 or any other data copy at another server is qualified for transmission. For example, the determination module 126 may determine whether the data copy 120 is a latest data copy at least partly based on multiple prioritized messages that are associated with multiple data copies stored at multiple servers and requested by the transmission module 130. The determination module 126 may retrieve update indicators from the multiple prioritized messages, rank the retrieved update indicators and the update indicator included in the prioritized message 132, and/or identify a first update indicator that includes presently latest update information among the retrieved update indicators. In addition, the determination module 126 may also determine whether the data copy 120 is stored at a local server such as one of the servers 108 local to the computing system 114. When retrieving the latest data copy, the determination module 126 may give preference to locally stored data copies over non-locally stored data copies as transmission speed, latency, and cost between local servers 108 is superior to data transmission between local and remote servers.

In one example, even though the data copy 120 is qualified for transmission, the data copy 120 may be determined as one of multiple qualified candidates for transmission. The computing system 114 may not have to transmit it if there are multiple qualified candidates. For instance, the computing system 114 may receive a request for reading data from another computing system residing at another data center such as data center 102(m). The another computing system, after receiving multiple prioritized messages from different servers, may determine that there is no locally stored data copy at the data center 102(m) while server 108(1) and another remote server both have the latest data copy, and randomly select one of the qualified candidates for transmission.

There are multiple mechanisms to prioritize transmission of the prioritized messages such as a path selection and a selective routing. In an example of path selection, there may be multiple cross-site links between two data centers among the data centers 102. The path selection module 128 may select the privileged path for the prioritized message 132 and the non-privileged path for the data copy 120 among the multiple cross-site links. The transmission module 130 may transmit the prioritized message 132 through the privileged path and the data copy 120 through the non-privileged path. In an example of selective routing, there may be one or more cross-site links between two data centers among the data centers 102. The transmission module 130 may transmit the prioritized message 132 ahead of the data copy 120 if they are transmitted through a same path. The present techniques may also enable the network to prioritize transmission of the prioritized message 132 based on selective routing. For instance, the router 106 may determine whether a message is the prioritized message 132 or a non-prioritized message and transmit the prioritized message 132 ahead of the non-prioritized message.

The path selection module 128 selects a cross-site link to transmit the data copy 120 and/or the prioritized message 132. In one example, the cross-site link may include one or more privileged paths and one or more non-privileged paths. The privileged path may refer to a cross-site link that represents the least amount of time or cost for data transmission. The non-privileged path may refer to a cross-link that requires more time or cost to transmit than the privileged path. For instance, the privileged path may only require routing by one router while the non-privileged path may require routing by several routers. For example, both the privileged path and the non-privileged path are dynamic and may be changeable. One cross-site link may be the privileged path at one time and the non-privileged path at another time depending on data volume, router setting, etc. As data volume via the privileged path is usually higher than data volume via the non-privileged path, the privileged path may have a high probability for congestion and longer latency. For example, the path selection module 128 may select the privileged path for the prioritized message 132, and the non-privileged path for the data copy 120 when the data copy 120 needs to be propagated from local servers 108 to remote servers. In another example, the path selection module 128 may transmit the data copy 120 via the privileged path when the data copy 120 is determined to be the latest data copy and/or specifically requested by another computing system at another data center.

In one example, the transmission module 130 sends the prioritized message 132 to the plurality of servers at different data centers 102 and receives their prioritized messages from other servers through the privileged path. Additionally or alternatively, the transmission module 130, when propagating the data copy from the local servers to remote server, may send the data copy 120 through the non-privileged path.

The present techniques may have a wide range of application scenarios. In an example e-commerce website scenario, the data copy 120 may include one or more of a user profile of a user 134 at the e-commerce website, a shopping cart of the user 134 at the e-commerce website, various items on sale at the e-commerce website, etc. In one example, the computing system 114 may initiate a replicating data process across the data centers 102 without intervention of the user 134. In this example, the e-commerce website may regularly back up data at different servers located at one or more of the plurality of data centers 102.

In another example, the computing system 114 may respond to a request from the user 134 to perform data operations. In this example, the user 134, via various applications on a user device 136, surfs the Internet. The user device 136 may be implemented as any of a variety of computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof. For example, respective applications at the user device 136 may communicate with a computing system of the e-commerce website to access and conduct operations on data that is stored, or to be stored, at the plurality of servers at the plurality of data centers 102.

The computing system of the e-commerce web site may determine that the computing system 114 and its residing data center 102(1) are local relative to the user device 136 compared with computing systems at other data centers. In one example, the user 134 may update the user profile at the e-commerce website through the user device 136. The computing system 114 may first find and retrieve the latest data copy from a plurality of data centers at least partly based on the plurality of prioritized messages received from the plurality of servers. In another example, the user 134 may create a new shopping cart, thereby generating new data, at the e-commerce web site through the user device 136.

Exemplary methods for performing techniques described herein are discussed in detail below. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The exemplary methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Figure 2:
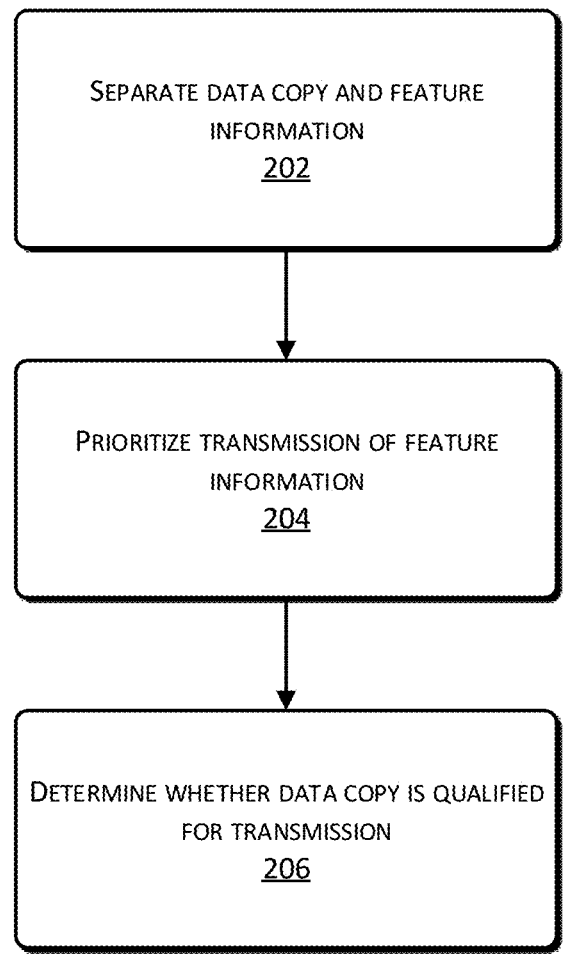
FIG. 2 illustrates a flowchart of an example method of separately transmitting data and feature information associated with the data.

FIG. 2 illustrates a flowchart of an example method of separately transmitting data and feature information associated with the data.

At 202, a respective data copy, such as the data copy 120, stored at a respective server, is separated from its associated one or more feature information. The one or more feature information may include one or more features of the data copy 120, such as the update indicator, ID of the data, etc.

At 204, the computing system 114 prioritizes transmission of the feature information in the data transmission. For example, the computing system 114 may include the feature information in the prioritized message 132, and send the prioritized message 132 through the privileged path in the data transmission before determining whether to transmit the data copy 120.

At 206, it is determined whether the respective data copy is qualified to transmit based on one or more factors. The one or more factors may include whether the data copy 120 is the latest data copy. The one or more factors may also include, for example, whether the data copy 120 is stored at a local server relative to a computing system that requests the data. For instance, the data copy 120 may be qualified to transmit based on a factor that the server 108(1) storing the data copy 120 is the local server relative to the computing system 114 that resides in the data center 102(1). Alternatively, a factor may include that the server 108(1) is a remote server relative to another computing system residing at another data center. The one or more factors may also include a type of data operation to be performed.

In one example, when the operation is writing the data copy 120 into the plurality of servers at the plurality of data centers 102, the computing system 114 newly creates the data copy 120 and there are no same or similar data copies at other servers. Thus, the data copy 120 is the latest data copy. The computing system 114 writes the data copy 120 into the local server 108(1) and then transmits the data copy to remote servers. In another example, when the computing system 114 reads or modifies data, it needs to retrieve the latest data copy among the plurality of data copies stored in the plurality of data centers 102. The computing system 114 thus may need to request and receive multiple prioritized messages from multiple servers, and compare the update indicator in the multiple prioritized messages with the update indicator in the prioritized message 132 to determine whether the data copy 120 is the latest data copy.

Figure 3:
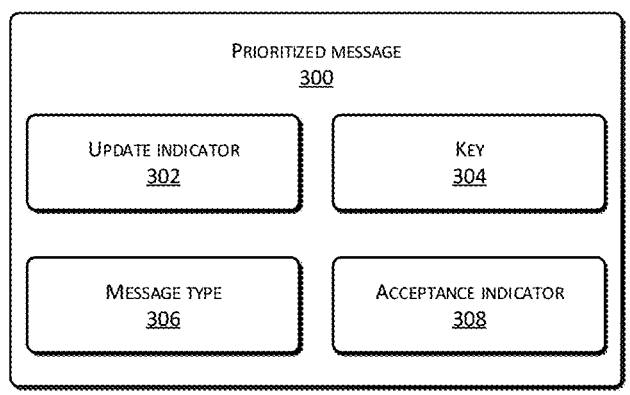
FIG. 3 illustrates an example prioritized message.

FIG. 3 illustrates an example prioritized message 300. The prioritized message 300 may include one or more feature information associated with a respective data copy stored at a respective server. The one or more feature information may include an update indicator 302, a key 304, a message type 306, and an acceptance indicator 308.

The update indicator 302 indicates update information of the respective data copy. The update indicator 302 may be a timestamp that indicates when the respective data copy associated with the prioritized message was last updated. There are various techniques to determine a value of the timestamp. For example, the respective server may have access to one or more synchronized clocks, which are used as counters. These clocks may be realized with global position system (GPS) sensors, radio signals, or protocols such as network time protocol (NTP). Alternatively, a distributed protocol that provides a global counter may be used.

The key 304 may be an identification (ID) indicating an object of the respective data copy. For example, the various data copies stored at the plurality of data centers 102 may have the same key 304 pointing to a same object even though the various data copies have similar or different data. The computing system 114 may, based on the key 304, classify received prioritized messages. Prioritized messages with the same key 304 may be grouped together.

The message type 306 indicates whether a message is a prioritized message. For example, the router 106, after extracting the message type 306 from the prioritized message 300, learns that the prioritized message 300 is a prioritized message and sends the prioritized message 300 through the privileged path. The acceptance indicator 308 may be an acceptance bit that indicates whether a request from a computing system is accepted or rejected.

In one example, the update indicator 302, such as the timestamp, may have a sufficient length to store the time information, such as 8 bytes. The key 304 may have variable length, but is typically small, such as 16 bytes. The message type 306 and the acceptance indicator 308 may be stored in one byte. As a whole, the size of the prioritized message 300 may be up to 35 bytes. In contrast, the respective data copy associated with prioritized message 300 (which is not prioritized) may have a value of several kilobytes, which is an order of magnitude larger than the prioritized message 300. This difference in size is advantageous since, in most cases, only the prioritized message 300 needs to be transmitted instead of the respective data copy.

Detailed operations such as a reading operation that reads the latest data copy from data copies stored at the plurality of data centers 102, a writing operation that writes the data copy into the plurality of data centers 102, and a modification operation that modifies the data copy stored at the plurality of data centers 102 are described in detail below. Each operation may use one or more of the modules in FIG. 1.

Figure 4:
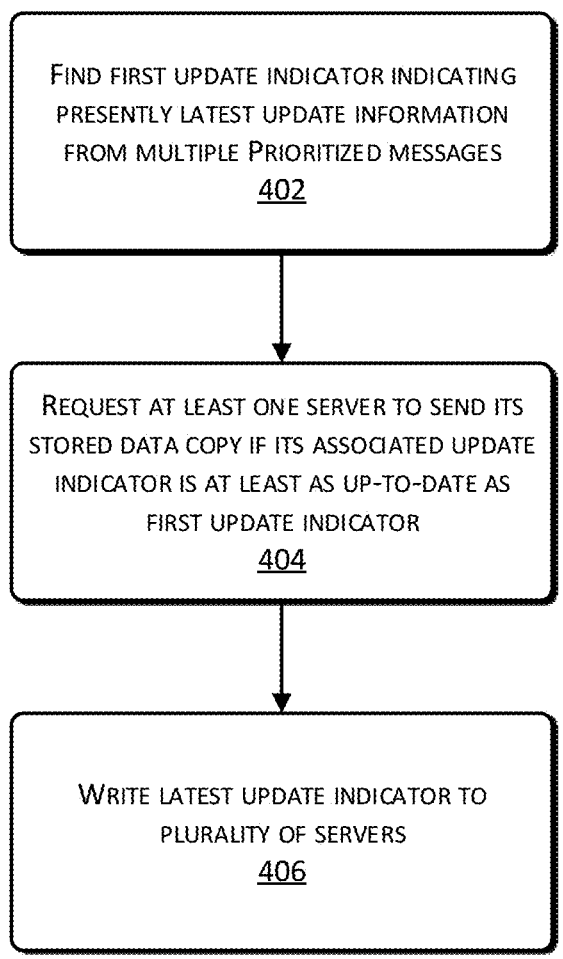
FIG. 4 illustrates a flowchart of an example method of reading a latest data copy from a plurality of data copies stored at a plurality of servers across the data centers.

FIG. 4 illustrates a flowchart of an example method 400 of reading a latest data copy from a plurality of data copies stored at a plurality of servers across the data centers 102. At 402, the computing system 114 finds a first update indicator indicating presently latest update information from multiple update indicators associated with multiple data copies stored at multiple servers among the data centers 102. The computing system 114 may request and receive multiple prioritized messages from multiple servers. Each respective prioritized message includes at least a respective update indicator indicating update information of a respective data copy stored at a respective server. The computing system 114 identifies the first update indicator from multiple update indicators extracted from the multiple prioritized messages.

At 404, the computing system 114 sends the first update indicator to at least one server and requests the at least one server to send its stored data copy if its associated update indicator, which may be called a second update indicator, includes update information at least as up-to-date as that of the first update indicator. The at least one server may respond only if its update indicator is at least as up-to-date as the first update indicator.

There are time lapses between operations at 402 and 404. It is possible that the data copy and its respective update indicator of the at least one server may be updated after 402. If the data copy stored at the at least one server has not changed after the at least one server sends its respective prioritized message at 402, its respective update indicator or the second update indicator is at most the same up-to-date as the first update indicator as the first update indicator indicates latest update information at 402. The first update indicator is then the latest update indicator.

If the data copy stored at the at least one server has changed after the at least one server responds to the request from the computing system 114 for the prioritized message, such that another computing system performs operation on the data copy, the second update indicator may be more up-to-date than the first update indicator. Thus, even if there is a change to the data copy made by another computing system between operations at 402 and operations at 404, the computing system 114 may still obtain the latest update indicator. For example, operations at 404 may complete when the computing system 114 obtains a first reply from the at least one server.

In one example, the at least one server may include each of the plurality of servers among the data centers 102. The computing system 114 sends the first update indicator to a plurality of servers, and requests each of the plurality of servers to send its stored data copy if its update indicator is at least as up-to-date as the first update indicator. In another example, the at least one server may be a subset of the plurality of servers such as the multiple servers from which the computing system 114 receives the multiple prioritized messages. In another example, the at least one server may only include one or more local servers.

At 406, the computing system 114 writes the latest update indicator to the plurality of servers at the data centers 102. For example, after 404, the computing system 114 may receive several data copies associated with several multiple update indicators that are more up-to-date than the first update indicator. This is possible as another one or more computing systems may operate on the data copies stored at the several servers. The computing system 114 may find the latest update indicator from the several update indicators. If the data copies have not been changed after 402, the first update indicator is the latest update indicator. The plurality of servers send acknowledgements to the computing system 114 after they receive the latest update indicator sent by the computing system 114. When the computing system 114 determines that a number of received acknowledgements have reached a threshold, such as a majority of the plurality of servers, the reading operation is complete.

When the read operation completes, at least some of the plurality of servers may receive the latest update indicator but not necessarily the latest data copy. The local servers 108 that store the latest data copy may propagate or transmit the latest data copy to the remote servers at the remote data centers via the non-privileged path.

In another example method of reading the latest data copy from the plurality of data servers, the computing system 114 may skip or omit the operations at 406. That is, the computing system 114 may not write the latest update indicator to the plurality of servers at the data centers 102 if the computing system 114 determines that at least two conditions have been met. First, at 402, the computing system 114 determines that a number of servers that have the first update indicator indicating the presently latest update information is more than a threshold, such as a majority of servers among the data centers 102. Second, the computing system 114 determines that the data copies received at 404 are associated with the first update indicator. If the two conditions have been met, it shows that the data copy associated with the first update indicator has not been changed after 402 and a threshold number of server already store the latest update indicator, i.e., the first update indicator. Thus, it is not necessary to write back the latest update indicator.

In another example method of reading the latest data copy from the plurality of data servers, the computing system 114 may conduct operations at 404 and 406 in parallel. When the computing system 114 determines at 402 that a number of servers that have the first update indicator indicating the presently latest update information is not more than a threshold, the computing system 114 may proactively write back the first update indicator to the plurality of servers when it requests the latest data copy at 404. When a data copy is received from another server at 404, the computing system 114 checks whether the update indicator associated with the received data copy is the same as the first update indicator. If they are the same, the computing system 114 determines that the first update indicator is still the latest update indicator and continues to write back the first update indicator to the plurality of servers. If they are not the same, the computing system 114 determines that the first update indicator is no longer the latest update indicator, starts to find the latest update indicator from the update indicators associated with received data copies at 404, and writes back the latest update indicator at 406.

Figure 5:
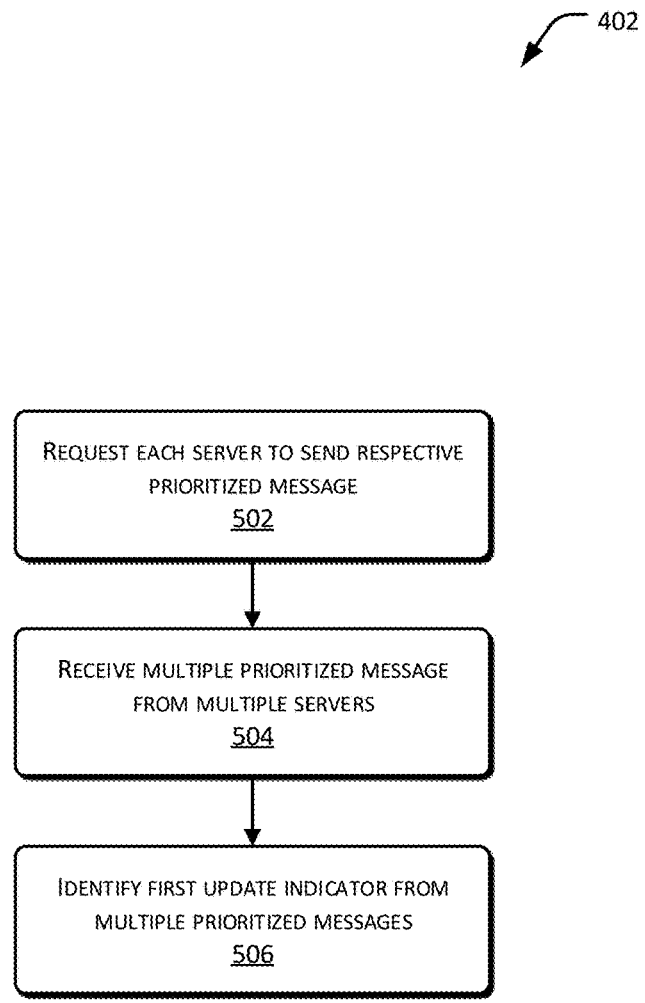
FIG. 5 illustrates a flowchart of an example method of finding a first update indicator that indicates presently latest update information from multiple received prioritized messages.

By reference to 402, FIG. 5 illustrates a flowchart of an example method of finding the first update indicator from multiple received prioritized messages. At 502, the computing system 114 requests each of the plurality of servers among the data centers 102 to send their respective prioritized messages associated with respective data copies stored therein. For example, the computing system 114 may search a database that stored configuration information of data to select the plurality of servers at the plurality of data centers 102 that store data copies. The back-up information may include a corresponding relationship between the key 304 and corresponding data copies. The configuration information may also include an ID of the plurality of servers where the data copies are stored. The configuration information may further include transmission latency, speed and other physical attributes of the transmission between a respective server and the server 108(1) where the computing system 114 resides to determine the privileged path and non-privileged path.

At 504, the computing system 114 receives multiple prioritized messages from multiple servers in the plurality of servers at the data centers 102. It is possible that the computing system 114 will not receive replies from all of the plurality of servers. For example, a server may fail to receive the request from the computing system 114 and/or send its respective prioritized message to the computing system 114. In another example, some prioritized messages may be lost during transmission.

For example, the computing system 114 may determine whether a number of received multiple prioritized message from the multiple server is more than a reply threshold. The reply threshold may be a majority of the number of the plurality of servers that the computing system 114 has sent requests at 502 or any preset number. If the number of received prioritized messages is less than the reply threshold, the computing system 114 may wait until the number of received prioritized messages is more than the reply threshold. If after a threshold of time, the number of received prioritized message is still lower than the reply threshold, the computing system 114 may resend the requests at 502.

If the number of received multiple prioritized messages is more than the reply threshold, the computing system 114 may continue to perform operations at 506. At 506, the computing system 114 identifies the first update indicator that indicates presently latest update information from multiple indicators included in the multiple prioritized messages. It is possible that more than one prioritized message has the first update indicator as the associated presently latest data copy may be stored at more than one server.

There are various techniques to identify the first update indicator, which may be based, at least in part, on a type of the update indicator. The computing system 114 may rank the multiple update indicators received from the multiple prioritized messages based on their respective update information included in the multiple update indicators. Then the computing system 114 finds the first update indicator that has the highest ranking indicating that its respective associated data copy is the presently latest data copy.

For example, the update indicator may be a version number of the data copy. The computing system 114 may identify the presently latest version number from multiple version numbers in the multiple prioritized messages. The presently latest version number is the version number that has the highest ranking, thus indicating that its respective associated data copy is the presently latest data copy.

For another example, the update indicator may be a timestamp. The computing system 114 may rank the multiple timestamps received from the multiple prioritized messages, and identify a timestamp that has the highest value, highest ranking, or latest update mark, thus indicating that its respective data copy is the presently last to be updated.

Figure 6:
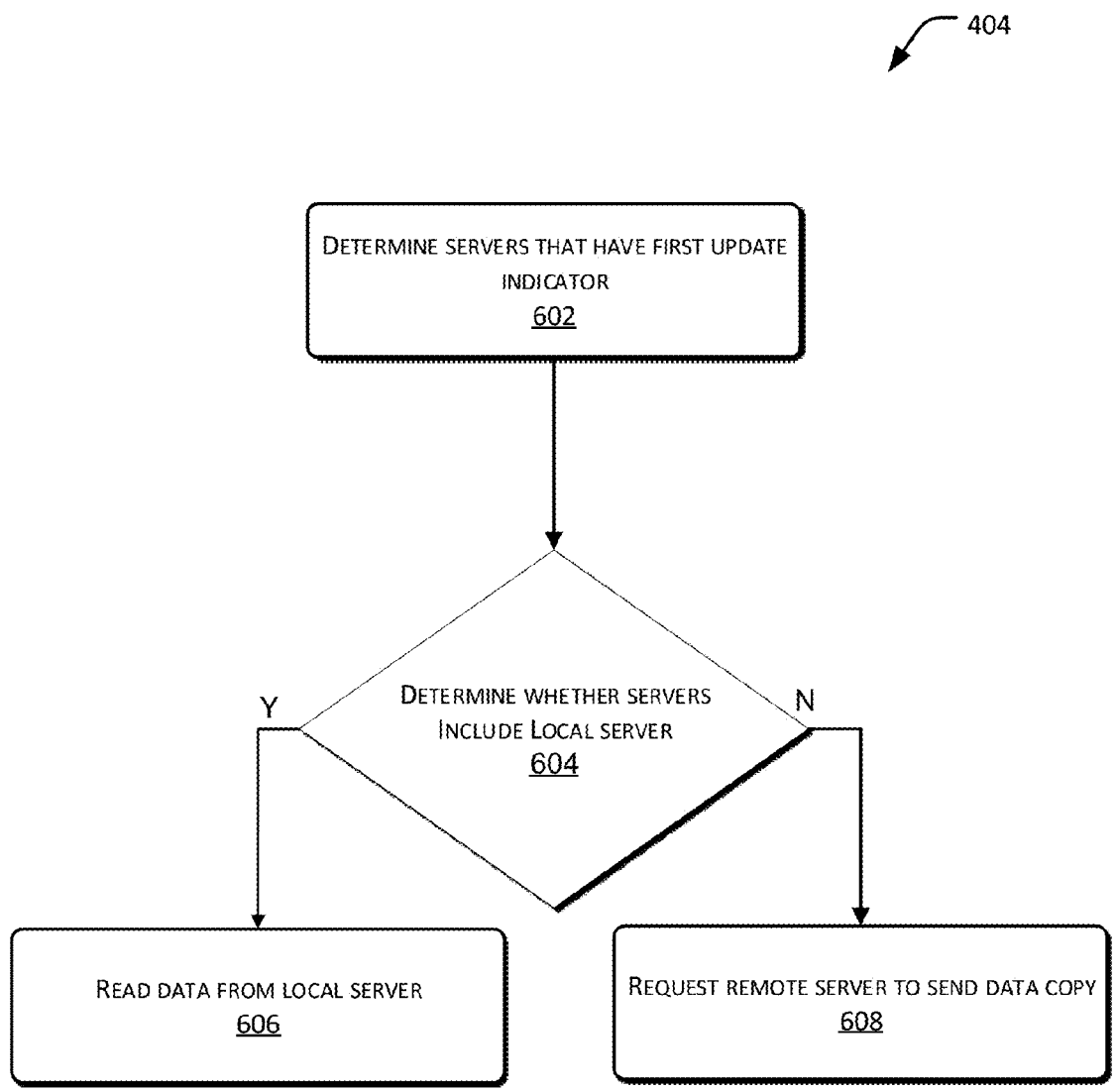
FIG. 6 illustrates an example method of requesting at least one server to send the latest data copy.

By reference to 404, FIG. 6 illustrates an example method of requesting at least one server to send the latest data copy. The computing system 114 may prefer local servers to remote servers even if they all store the latest data copies as the data transmission within a data center is usually faster than the data transmission across different data centers.

At 602, the computing system 114 determines one or more servers, from the multiple servers that respond with their multiple prioritized messages and that have the first update indicator. For example, the prioritized message may carry ID or other information of the server that sends the prioritized message. The computing system 114 may thus determine the one or more servers whose data copies are associated with the first update indicator.

At 604, the computing system 114 determines whether the one or more servers include a local server such as the local server 108(1) or 108(j). At 606, if a result of determination is positive, the computing system 114 requests or reads a data copy from the local server.

At 608, if a result of determination is negative which means the one or more servers are all remote servers, the computing system 114 may request one of the remote servers to send its data copy. For example, the computing system 114 may rank transmission latencies of the one or more servers. The ranking may be based on the database whose configuration information includes data transmission latencies between different servers and the server 108(1) where the computing system 114 resides. Alternatively, the computing system 114 may keep a history of recent latencies at remote data centers, and send a single request to one of the remote servers with a least latency or a latency smaller than a preset threshold. For instance, the computing system 114 may obtain the transmission latency based on a waiting time to receive the prioritized message from the remote server after the computing system 114 sends the request.

Figure 7:
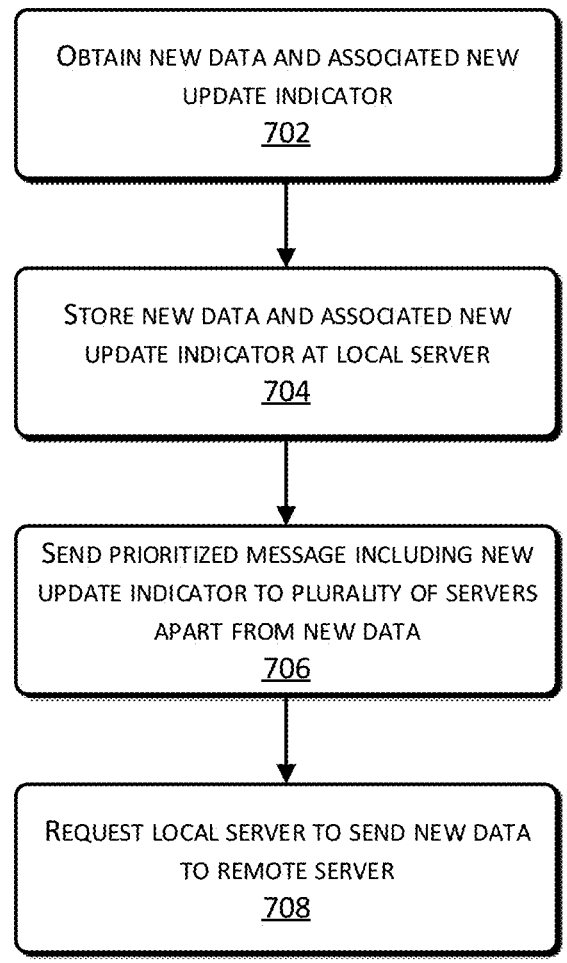
FIG. 7 illustrates an example method of writing new data into a plurality of servers in a plurality of data centers.

FIG. 7 illustrates an example method of writing new data into a plurality of servers across the data centers 102. At 702, the computing system 114 obtains new data and associated new update indicator indicating when the new data is generated. The new data and/or the new update indicator may be generated by the computing system 114 or another computing system. At 704, the computing system 114 stores copies of the new data and the associated new update indicator at one or more local servers such as the local server 108(1). In one example, each of the local servers 108 will send an acknowledgment to the computing system 114 when it receives the new data and its associated data copy. The computing system 114 may wait until a number of acknowledgements are higher than a reply threshold. The reply threshold may be a majority of the number of the local servers 108 or a preset number.

At 706, the computing system 114 sends a prioritized message to the plurality of servers at the data centers 102. The prioritize message includes the new update indicator. In one example, the computing system 114 may only send the prioritized message to the remote servers as the local servers 108 already received the update indicator at 704.

In one example, the computing system 114 may request each of the local servers 108 to send an acknowledgment to the computing system 114 when it receives the prioritized message. The computing system 114 may determine whether a number of acknowledgements is higher than a reply threshold. The reply threshold may be a majority of the plurality of servers or a preset number. When the computing system 114 determines that the number of acknowledgements is higher than the reply threshold, it completes the sending operations.

At 708, the computing system 114 requests that the one or more local servers 108 send their stored copies of new data to the remote servers. The computing system 114 does not need to wait to complete the transmission, because a number of local servers 108 already store copies of the new data at 704 and a number of servers including local servers and remote servers already store the new update indicators at 706. If another computing system in a different data center executes a read operation of the new data, it would observe the new update indicator from at least one server and wait for the new data.

Table 1 illustrates example algorithms for reading and writing operations by using pseudocodes.

```
function read(key):
    acks←sendwait(*⟨ R-TS,key⟩ ,nodes[key], [ (n+1)/2])
    mts←max_{1≤i≤⌈(n+1)/2⌉}acks[i].msg.ts
    data←sendwait(*⟨ R-DATA,key,mts⟩ ,nodes[key],1)
    sendwait(*⟨ W-TS, key, data[0].ts⟩ , nodes[key], [(n+1)/2])
    return data[0].val
function write(key,val):
    ts←clock( )
    sendwait(⟨ W-LOCAL, key, ts, val⟩ , local_nodes[key], [(n+1)/2])
    sendwait(*⟨ W-TS, key, ts⟩ , nodes[key], [(n+1)/2])
function sendwait(msg, nodes, num_acks):
    send msg to nodes
    wait for num_acks replies
    return the replies in an array acks[0..num_acks−1]
upon receive ⟨ R-TS, key⟩ :
    return *⟨ ACK-R-TS, ts[key]⟩
upon receive ⟨ R-DATA, key, ts⟩ :
    wait until ts[key] ≥ ts and val[key] ≠⊥
    return ⟨ ACK-R-DATA, ts[key], val[key]⟩
upon receive ⟨ W-TS, key, ts⟩ :
    if ts > ts[key] then
        ts[key] ← ts
        if remote_buf[key][ts] exists then
            val[key]←remote_buf[key][ts]
            delete remote_buf[key][x]for all x ≤ ts
        else val[key] ← ⊥
    return *⟨ ACK-W-TS⟩
upon receive ⟨ W-LOCAL, key, ts, val⟩ :
    local buf[key][ts] ← val
    async
```

```
        sendwait(⟨W-REMOTE, key, ts, val⟩, nodes[key], ⌈(n+1)/2⌉)
        delete local_buf[key][ts]
    return *⟨ACK-W-LOCAL⟩
upon receive ⟨W-REMOTE, key, ts, val⟩:
    if ts = ts[key] then val[key]←val
    else if ts > ts[key] then remote_buf[key][ts] ← val
    return ⟨ACK-W-REMOTE⟩
```

In the Table 1, read(key) and write(key, v) represent the reading operation and the writing operation for an object, i.e. data, respectively with a given key. Key represents an ID of the object. v represents a value of an object, i.e., a data copy. A replica represents a server or computer storage media that stores a respective data copy of the object. n is the number of replicas for the object, and f is a fault-tolerance parameter indicating the maximum number of replicas that may crash. mts represents a largest timestamp indicating latest update. The algorithm requires that f<n/2, such that only a minority of replicas may crash. The replica set of an object with a given key is denoted nodes[key], while the local replica set at a given data center or site is denoted local nodes[key, site]. Site represents a data center or server. The site from local nodes [key, site] is omitted when the site is local relative to the computing system or client requesting data. That is, local_nodes [key] refers to the local replica set at the client's site. A prioritized message m is denoted *<m>, and a normal message m is denoted <m>. The symbol ⊥ indicates a non-value or a temporary placeholder. The communication in the algorithm occurs via a simple function sendwait, which sends a given message msg to a set of nodes and waits for num_acks replies. The replies are returned in an array.

Figure 8:
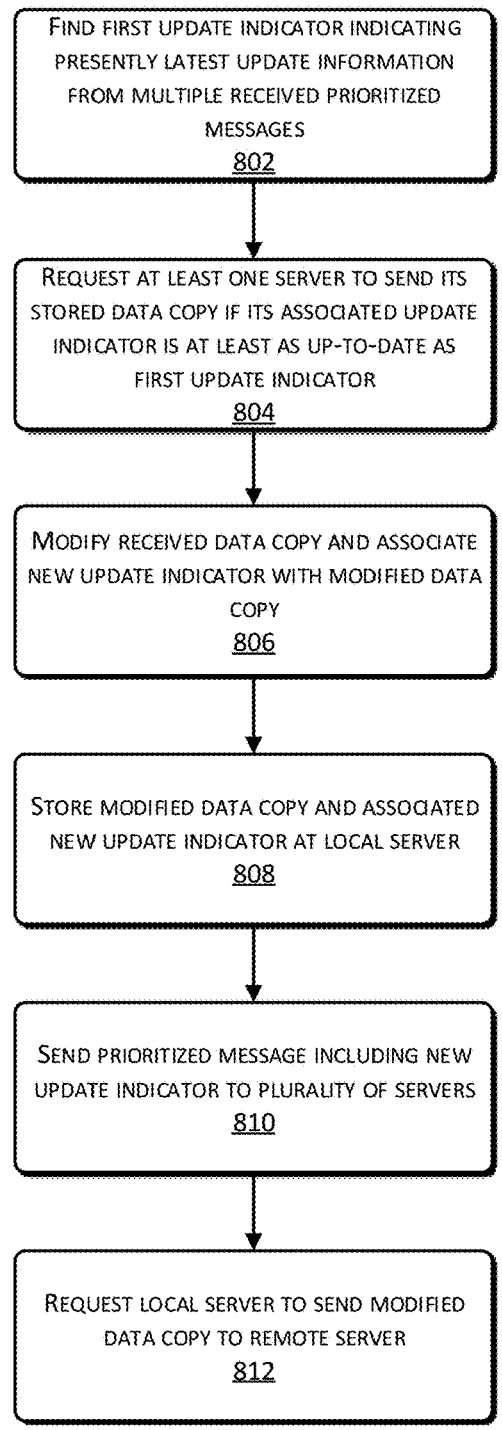
FIG. 8 illustrates a flowchart of an example method of modifying data across the plurality of servers in the plurality of data centers.

FIG. 8 illustrates a flowchart of an example method of modifying data across the plurality of servers among the data centers 102. The techniques in data modification in FIGS. 8 and 9 may include similar techniques as described above with regard to the reading data operations and the writing data operations of FIGS. 4-7, when appropriate. Accordingly, some relevant details may be referenced to FIGS. 4-7 and their corresponding descriptions. In addition, some techniques in data modification described in this section may also be used in the data reading and writing operations described above, when appropriate.

At 802, the computing system 114 finds the first update indicator indicating presently latest update information from multiple update indicators associated with multiple data copies stored at multiple servers among the data centers 102. For example, the computing system 114 may send requests to a plurality of servers and receive multiple prioritized messages from multiple servers in the plurality of servers. Each respective prioritized message includes at least a respective update indicator indicating update information of a respective data copy stored at a respective server. The computing system 114 identifies the first update indicator from multiple update indicators extracted from the multiple prioritized messages. For example, data transmission at 802 may be transmitted via the privileged path.

At 804, the computing system 114 sends the first update indicator to at least one server and requests the at least one server to send its stored latest data copy. For example, the at least one server may respond only if it has an update indicator that is at least as up-to-date as the first update indicator. For example, operations at 804 may complete when the computing system 114 obtains a first reply from the at least one server. The computing system 114 receives the latest data copy from the at least one server. For example, data transmission at 804 may be transmitted via the privileged path.

At 806, the computing system 114 applies one or more commands to modify the received latest data copy to obtain a modified data copy and associate a new update indicator with the modified data copy. At 808, the computing system 114 stores the modified data copy and the associated update indicator at one or more local servers such as the local server 108(1). In one example, each of the local servers 108 will send an acknowledgment to the computing system 114 when it receives the modified data copy and its associated new update indicator. The computing system 114 may wait until a number of acknowledgements is higher than a reply threshold. The reply threshold may be a majority of the number of the local server 208 or a preset number. For example, data transmission at 808 may be transmitted via the privileged path.

At 810, the computing system 114 sends prioritized messages to the plurality of servers at the data centers 102. The prioritized messages includes the new update indicator. In one example, the computing system 114 may send only the prioritized message to the remote servers as the local servers 108 already receives the new update indicator at 808. For example, data transmission at 810 may be transmitted via the privileged path.

In one example, the computing system 114 may request the plurality of servers to send acknowledgements after they received the prioritized messages. The computing system 114 may determine whether a number of acknowledgements is higher than a reply threshold. The reply threshold may be a majority of the number of the plurality of servers or a preset number. When the computing system 114 determines that the number of acknowledgements is higher than the reply threshold, it completes the sending operation at 810.

At 812, the computing system 114 requests the one or more local servers 108 to send their stored modified data copies to the remote servers. The computing system 114 does not need to wait for the transmission to complete, because a number of local servers 108 already store the modified data copy at 808 and a number of servers, including local servers and remote servers, already store the update indicator at 706. If another computing system in a different data center executes a read operation of the modified data copy, it would observe the new update indicator from at least one server and wait for the modified data copy. For example, the propagation of modified data copies from local servers to remote servers at 812 may be transmitted via the non-privileged path.

Figure 9:
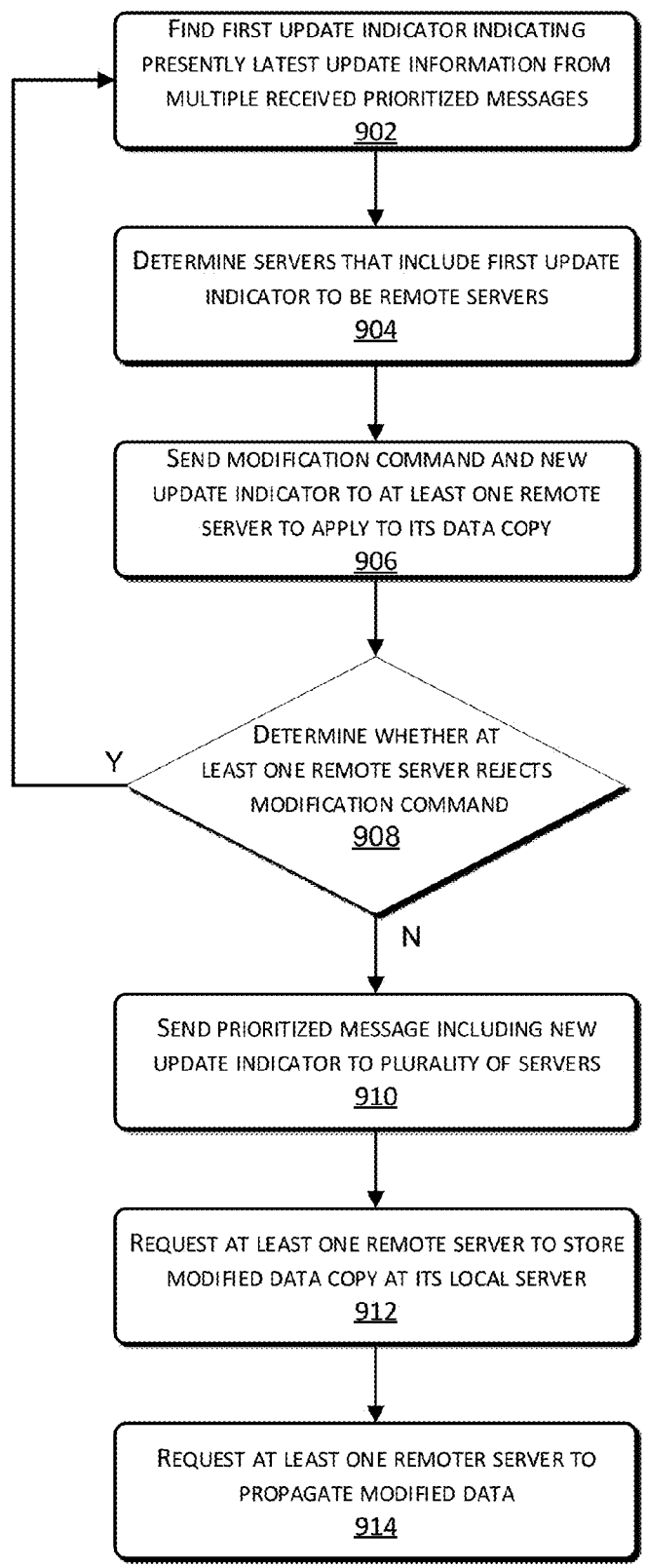
FIG. 9 illustrates a flowchart of another example method of modifying data in the plurality of servers across the plurality of data centers.

In the example of FIG. 8, the computing system 114 reads the latest data copy from the plurality of servers, applies the modification command to obtain the modified data, and writes the modified data to the plurality of servers. Doing so involves transferring the data copy from the servers to the computing system 114 and back to the servers. If the latest data copy is stored at a remote server to the computing system 114, it may be more efficient for the computing system 114 to send the modification command to the remote server to modify data, thereby avoid transferring the value back and forth. Accordingly, FIG. 9 illustrates a flowchart of another example method of modifying data across the plurality of servers in the plurality of data centers 102.

At 902, the computing system 114 finds the first update indicator indicating presently latest update information from multiple received prioritized messages. At 904, the computing system 114 determines one or more servers that include the first update indicator are all remote servers.

At 906, the computing system 114 sends one or more modification commands and a new update indicator to at least one of the one or more server that have the first update indicator. The computing system 114 also requests that each server send a reply after it accepts or rejects the modification commands. In one example, the computing system 114 may send the modification commands to all the remote servers that store data copy associated with the first update indicator. In another example, the computing system 114 may send the modification commands to one of the remote servers with a least latency or a latency smaller than a preset threshold.

After receiving the modification commands and the new update indicator, each server determines whether to accept or reject the modification commands and the new update indicator, and sends a reply relating acceptance or rejection to the computing system 114. Each server may reject the modification command if it finds an update indicator that is more up-to-date than the new update indicator. For instance, another computing system may modify data copy at the server between operation at 902 and 906 and thus its stored update indicator is more up-to-date than the first update indicator.

If the server accepts the modification commands and the new update indicator, the server applies the modification commands to its stored latest data copy, obtains a modified data copy, and associates the received new update indicator with the modified data copy. Each server may store the modified data copy and the new update indicator in a temporary buffer.

At 908, the computing system 114 receives the replies from each server and determines whether at least one server sends the rejection. The computing system 114 may wait until a number of the replies are more than a threshold such as a majority of the number of servers to which the computing system 114 sends the modification commands and new update indicators at 904 or a preset number. If at least one of the replies is rejection, it means that the first update indicator no longer includes the presently latest update information and data copy associated with the first update indicator is no longer the latest data copy and the computing system 114 may need to restart the process from operations at 902. If none of the replies is rejections, the computing system 114 may proceed to request each server to write the modified data copy into the plurality of servers including the local servers 108 relative to the computing system 114.

At 910, the computing system 114 sends the prioritized message including the new update indicator to the plurality of servers. At 912, the computing system 114 requests each server to retrieve the modified data copy and the associated new update indicator from its temporary buffer and store them in their respective local servers. For example, the modified data copy may then overwrite the previous data copy stored at each server. At 914, each local server may propagate their stored modified data copies associated with the new update indicator to the remote servers.

Table 2 illustrates an example algorithm for modifying data operations.

```
function execute(key,command):
    ots ← clock( )
    acks ← sendwait(*⟨OR-TS, key, ots⟩, nodes[key], ⌈(n+1)/2⌉)
    if acks = ⊥ then return ⊥
    mts ← max_{1≤i≤⌈(n+1)/2⌉} acks[i].msg.ts
    data ← sendwait(*⟨OR-DATA, key, mts⟩, nodes, 1)
    if data = ⊥ then return ⊥
    ⟨val, r⟩ ← apply(data[0].val, command)
```

-continued

```
    sendwait(⟨W-LOCAL, key, ots, val⟩, local_nodes[key],
        ⌈(n+1)/2⌉)
    w_acks ← sendwait(*⟨OW-TS, key, ots⟩), nodes[key],
        ⌈(n+1)/2⌉)
    if w_acks=⊥ then
        return ⊥
    else
        return r
function sendwait(msg, nodes, num_acks):
    send msg to nodes
    wait for num_acks replies
    if any reply has status = false then return ⊥
    else return the replies in an array acks[0..num_acks-1]
upon receive ⟨OR-TS, key, ots⟩ :
    if ots > ots[key] then
        ots[key] ← ots
        return *⟨ACK-OR-TS, true, ts[key]⟩
    else
        return *⟨ACK-OR-TS, false⟩
upon receive ⟨OR-DATA, key, ts⟩ :
    wait until ts[key] ≥ ts and val [key] ≠ ⊥
    if ts[key] = ts then
        return ⟨ACK-OR-DATA, true, val[key]⟩
    else
        return ⟨ACK-OR-DATA, false⟩
upon receive ⟨OW-TS, key, ots⟩ :
    if ot ≥ ots[key] then
        ots[key] ← ots
        ts[key] ← ots
        if remote_buf[key][ots]exists then
            val[key] ← remote_buf[key][ots]
            delete remote_buf[key][x] for all x ≤ ots
        else
            val[key]← ⊥
        return *⟨ACK-OW-TS, true⟩
    else
        return *⟨ACK-OW-TS, false⟩
upon receive ⟨W-LOCAL, key, ts, val⟩ :
    local_buf[key][ts] ← val
    async
        sendwait(⟨W-REMOTE, key, ts, val⟩, nodes[key],
            ⌈(n+1)/2⌉)
        delete local_buf[key][ts]
    return * ⟨ACK-W-LOCAL⟩
upon receive ⟨W-REMOTE, key, ts, val⟩ :
    if ts = ts[key] then
        val[key] ← val
    else if ts > ts[key] then
        remote_buf[key][ts] ← val
    return ⟨ACK-W-REMOTE⟩
```

The operation execute (command) executes the commands. In the modification operation, the data objects are state machines, and the command can be an arbitrary deterministic procedure that, based on the current state of the object, modifies the stage of the object and returns a result. The new state of the object and the result are returned by the apply function, which takes as argument the current state and the command. In one example, consider a slightly weaker type of state machine, where if many concurrent commands are executed on the same data object, the computing system is allowed to abort the execution of the commands, returning a special value ⊥. The symbol ⊥ represents that the computing system aborts the execution of the commands and returns the special value. Aborted operations may or may not take effect. If an aborted operation does not take effect, the computing system may reissue the operation after a while. By using techniques such as exponential random back-off or a leader election service, it is possible to guarantee that the operation takes effect exactly once.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
identifying a data item stored at a first computing device of a network that includes a plurality of computing devices, the network including a plurality of copies of the data item distributed across the plurality of computing devices of the network;
sending, from the first computing device to the plurality of computing devices, a request for a prioritized message from each of the plurality of computing devices, each given prioritized message comprising at least an update indicator associated with a most recent time a copy of the data item was updated at each given computing device of the plurality of computing devices;
receiving, at the first computing device, a plurality of prioritized messages from at least one of the plurality of computing devices, wherein at least one of the plurality of prioritized messages was received via a first path that met one or more first criteria when the message was sent on the first path;
determining that a reply threshold has been met based at least partially on a total number of received prioritized messages;
based on determining that the reply threshold has been met, analyzing the plurality of received prioritized messages to identify a particular prioritized message having a first update indicator that is associated with a copy of the data item that is most recent as compared to all of the plurality of received prioritized messages;
based on identifying the particular prioritized message, identifying a particular computing device of the plurality of computing devices of the network at which the most recent copy of the data item is stored;
sending, from the first computing device to the particular computing device, a request for the most recent copy of the data item to be distributed to the plurality of computing devices of the network; and
receiving, at the first computing device, the most recent copy of the data item via a second path that met one or more second criteria when the most recent copy of the data item was sent on the second path.

2. The method as recited in claim 1, wherein a size of each given prioritized message is smaller than a size of a copy of the data item associated with the given prioritized message.

3. The method as recited in claim 1, further comprising:
identifying a prioritized message having a second update indicator that is at least as up-to-date as the first update indicator and a different computing device at which a copy of the data item associated with the second update indicator is stored; and
sending, from the first computing device to the different computing device, a request for a copy of the data item stored at the different computing device.

4. The method as recited in claim 3, wherein sending a request for a copy of the data item stored at the different computing device comprises:
sending the first update indicator to a plurality of computing devices; and
requesting each of the plurality of computing devices to send a stored data copy if the stored data copy has an associated update indicator that includes update time information at least as up-to-date as that of the first update indicator.

5. The method as recited in claim 1, further comprising requesting, by the first computing device, at least one computing device to send a data copy stored at the at least one computing device if the copy of the data item is associated with a second update indicator indicating update time information that is at least as up-to-date as that of the first update indicator;
applying one or more modification commands to the copy of the data item to obtain a modified data copy;
associating a new update indicator with the modified copy of the data item; and
storing the modified copy of the data item and the new update indicator at a local computing device.

6. The method as recited in claim 5, further comprising propagating the modified copy of the data item and the new update indicator from the local computing device to one or more remote computing devices.

7. The method as recited in claim 1, further comprising:
determining one or more remote computing devices that store one or more copies of the data item associated with the first update indicator from the plurality of computing devices;
sending one or more modification commands and a new update indicator to at least one of the one or more remote computing devices; and
requesting the at least one of the one or more remote computing devices to apply the one or more modification commands to the stored one or more copies of the data item to obtain a modified copy of the data item and associate the new update indicator with the modified copy of the data item.

8. The method of claim 1, wherein a particular path meets the one or more first criteria at a first time, and meets the one or more second criteria at a second time, such that the particular path comprises both the first path and the second path.

9. The method of claim 1, wherein the first path is also the second path.

10. The method of claim 1, wherein the one or more first criteria include one or more of: a time for data transmission on the first path, a cost for data transmission on the first path, a number of routers on the first path, data volume on the first path, congestion on the first path, or latency on the first path.

11. The method of claim 1, wherein the one or more second criteria include one or more of: a time for data transmission on the second path, a cost for data transmission on the second path, a number of routers on the second path, data volume on the second path, congestion on the second path, or latency on the second path.

12. A computing device, comprising:
one or more processors; and
one or more computer readable storage media having stored thereon computer-executable instructions that are executable by the one or more processors to cause the computing device to update redundant data within a plurality of computing devices in a network while conserving network bandwidth, the computer-executable instructions including instructions that are executable to cause the computer system to perform at least the following:
identify a data item stored at the computing device, the network including a plurality of copies of the data item distributed across the plurality of computing devices of the network;

send, from the computing device to the plurality of computing devices, a request for a prioritized message from each of the plurality of computing devices, each given prioritized message comprising at least an update indicator associated with a most recent time a copy of the data item was updated at each given computing device of the plurality of computing devices;

receive, at the computing device, a plurality of prioritized messages from at least one of the plurality of computing devices, wherein at least one of the plurality of prioritized messages was received via a first path that met one or more first criteria when the message was sent on the first path;

determine that a reply threshold has been met based at least partially on a total number of received prioritized messages;

based on determining that the reply threshold has been met, analyze the plurality of received prioritized messages to identify a particular prioritized message having a first update indicator that is associated with a copy of the data item that is most recent as compared to all of the plurality of received prioritized messages;

based on identifying the particular prioritized message, identify a particular computing device of the plurality of computing devices of the network at which the most recent copy of the data item is stored;

send, from the computing device to the particular computing device, a request for the most recent copy of the data item to be distributed to the plurality of computing devices of the network; and receive, at the computing device, the most recent copy of the data item via a second path that met one or more second criteria when the most recent copy of the data item was sent on the second path.

13. The computing device as recited in claim 12, wherein a size of each given prioritized message is smaller than a size of a copy of the data item associated with the given prioritized message.

14. The computing device as recited in claim 12, wherein the computer-executable instructions further include instructions that are executable to cause the computing device to:
identify a prioritized message having a second update indicator that is at least as up-to-date as the first update indicator and a different computing device at which a copy of the data item associated with the second update indicator is stored; and
send, from the computing device to the different computing device, a request for a copy of the data item stored at the different computing device.

15. The computing device as recited in claim 12, wherein the computer-executable instructions further include instructions that are executable to cause the computing device to propagate the most recent copy of the data item from one or more local computing devices to one or more remote computing devices.

16. The computing device of claim 12, wherein a particular path meets the one or more first criteria at a first time, and meets the one or more second criteria at a second time, such that the particular path comprises both the first path and the second path.

17. The computing device of claim 12, wherein the first path is also the second path.

18. The computing device of claim 12, wherein the one or more first criteria include one or more of: a time for data transmission on the first path, a cost for data transmission on the first path, a number of routers on the first path, data volume on the first path, congestion on the first path, or latency on the first path.

19. The computing device of claim 12, wherein the one or more second criteria include one or more of: a time for data transmission on the second path, a cost for data transmission on the second path, a number of routers on the second path, data volume on the second path, congestion on the second path, or latency on the second path.

20. A computer program product comprising one or more hardware storage devices having stored thereon computer-executable instructions that are executable by one or more processors of a computer system to cause the computer system to update redundant data within a plurality of computing devices in a network while conserving network bandwidth, the computer-executable instructions including instructions that are executable to cause the computer system to perform at least the following:
identify a data item stored at a first computing device of a network that includes a plurality of computing devices, the network including a plurality of copies of the data item distributed across the plurality of computing devices of the network;

send, from the first computing device to the plurality of computing devices, a request for a prioritized message from each of the plurality of computing devices, each given prioritized message comprising at least an update indicator associated with a most recent time a copy of the data item was updated at each given computing device of the plurality of computing devices;

receive, at the first computing device, a plurality of prioritized messages from at least one of the plurality of computing devices, wherein at least one of the plurality of prioritized messages was received via a first path that met one or more first criteria when the message was sent on the first path;

determine that a reply threshold has been met based at least partially on a total number of received prioritized messages;

based on determining that the reply threshold has been met, analyze the plurality of received prioritized messages to identify a particular prioritized message having a first update indicator that is associated with a copy of the data item that is most recent as compared to all of the plurality of received prioritized messages;

based on identifying the particular prioritized message, identify a particular computing device of the plurality of computing devices of the network at which the most recent copy of the data item is stored;

send, from the first computing device to the particular computing device, a request for the most recent copy of the data item to be distributed to the plurality of computing devices of the network; and receive, at the first computing device, the most recent copy of the data item via a second path that met one or more second criteria when the most recent copy of the data item was sent on the second path.

* * * * *